Sept. 27, 1960     G. B. WRIGHT     2,954,260
UTILITY TRAILER FOR SMALL CARS
Filed March 26, 1959     2 Sheets-Sheet 1
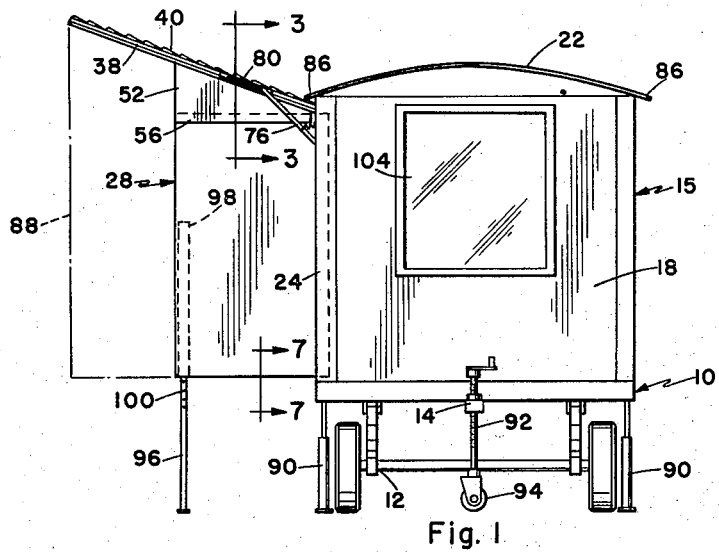
INVENTOR.
GEORGE B. WRIGHT
BY
Knox & Knox Sept. 27, 1960   G. B. WRIGHT   2,954,260
UTILITY TRAILER FOR SMALL CARS
Filed March 26, 1959   2 Sheets-Sheet 2

INVENTOR.
GEORGE B. WRIGHT
BY
Knox & Knox

United States Patent Office 2,954,260
Patented Sept. 27, 1960

2,954,260

UTILITY TRAILER FOR SMALL CARS

George B. Wright, 822 W. Montecito, San Diego 3, Calif.

Filed March 26, 1959, Ser. No. 802,073

8 Claims. (Cl. 296—23)

The present invention relates generally to vehicle trailers and more particularly to a utility trailer for small cars.

The primary object of this invention is to provide a compact utility trailer having a hinged side and a novel door arrangement by which a roofed area may be erected at one side of the trailer without detaching any parts or adding accessories.

Another object of this invention is to provide a trailer in which one side comprises the roof portion and outwardly swinging doors in the same side have hinged upper portions which support the roof, the outer edge of the roof being substantially higher than the door opening for maximum head room.

Still another object of this invention is to provide a trailer having sealing means to prevent rain leakage from the roof and to seal the structure when closed.

A further object of this invention is to provide a trailer which is easily erected for use and is firmly supported, the interior having ample space for a variety of equipment.

Another object of this invention is to provide a utility trailer which is adapted for fabrication from any different materials, so that the choice of material can be according to the dictates of availability and price considerations, the exact sizes and proportions being matters easily determined to suit particular conditions and needs.

Another object of this invention is to provide a utility trailer which is practicable and inexpensive to manufacture.

Finally, it is an object to provide a utility trailer of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Figure 1 is a front end elevation view of the trailer with the roof erected;

Figure 2 is a side elevation view thereof taken from the left side of Figure 1;

Figure 7 is an enlarged fragmentary view taken in the direction of arrows 7—7 in Figure 1, but showing the roof and doors closed.

Similar characters of reference indicate similar or identical elements and portions throughout the specification and throughout the views of the drawings.

Figure 5:
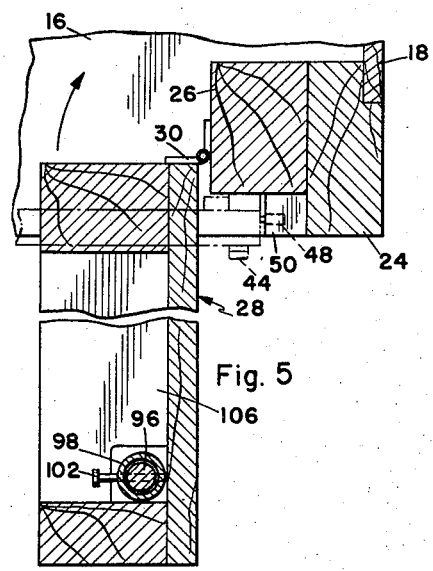
Figure 5 is an enlarged fragmentary sectional view taken on the line 5—5 of Figure 2.
Figure 6:
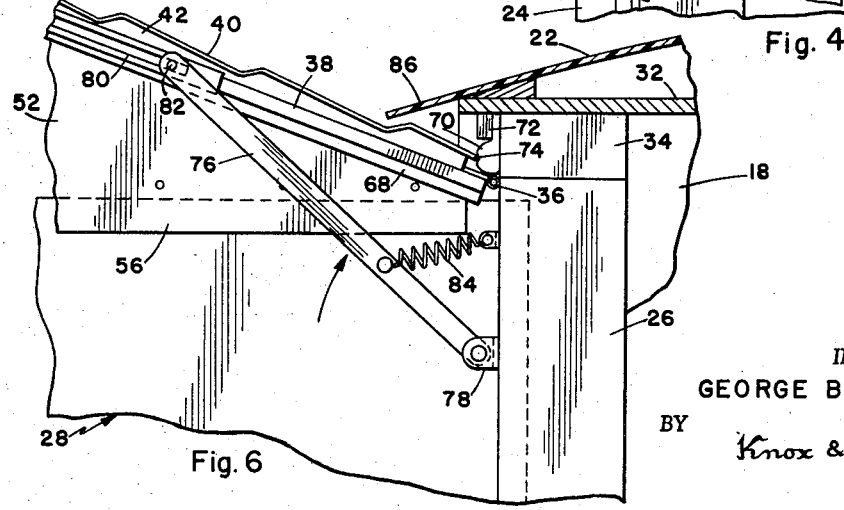
Figure 6 is a sectional view taken on the line 6—6 of Figure 3.

The trailer itself is built on a chassis 10 having a wheeled carriage 12 and a tow bar 14 in the conventional manner, the trailer body 15 having a floor 16, ends 18, a closed side 20 and a top 22. The other side has upright end posts 24 to which are fixed inner jamb posts 26 set back slightly from the edges of said end posts, as shown in Figures 5 and 6. Mounted on the jamb posts 26 are two similar doors 28 secured by suitable hinges 30 to swing outwardly on vertical axes, the doors, when open, substantially extending the width of the trailer to one side thereof. The top 22 has an inner ceiling panel 32 to which is secured a header beam 34 resting at its ends on the jamb posts 26 and spanning the openings of the trailer side. Secured to the header beam 34 is a full length, transverse piano hinge 36, to which is attached a rectangular roof panel 38 having an outer cover panel 40 fixed thereto and sealed at the edges by suitable sealing pads 42 of foam rubber or the like. In closed position the roof panel 38 serves as a side of the trailer body 15 and is held in place by conventional latches having actuating arms 44 and tongues 46 which engage in sockets 48 cut into small latch blocks 50, said latch blocks being fixed to the lower ends of jamb posts 26, as in Figure 7. Other types of fasteners may be used according to requirements.

Figure 3:
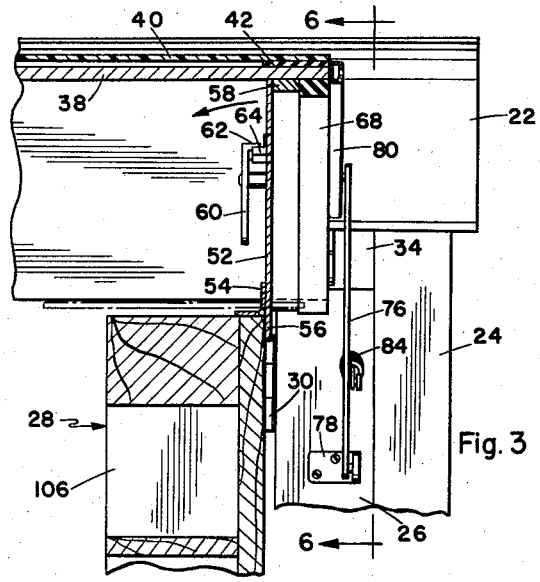
Figure 3 is an enlarged fragmentary sectional view taken on the line 3—3 of Figure 1.
Figure 4:
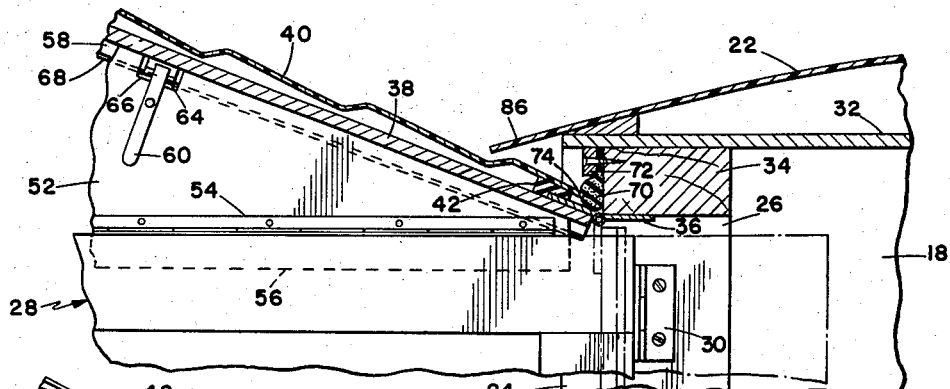
Figure 4 is an enlarged fragmentary sectional view taken on the line 4—4 of Figure 2.

The roof panel 38 swings upwardly and outwardly and is supported by the doors 28. Since the trailer is of small dimensions, the head room is somewhat limited and the roof panel is therefore held at an angle with its outer edge considerably higher than the trailer side opening. Each door 28 has a tapered support plate 52 attached to the upper edge thereof by a hinge 54, the plate normally lying horizontally on top of the door in closed position. When opened, the support plates swing upwardly to vertical positions and have extended stop portions 56 which bear against the outer faces of the doors, as in Figures 3 and 6, to prevent their collapse. The roof panel 38 rests on upwardly and outwardly inclined edges of the support plates 52 and is provided with stop strips 58 against which the support plates rest for rigidity. To prevent the roof panel 38 from being forced upwardly, as by wind, the support plates 52 are provided with pivoted catches 60 having tongues 62 which engage in small brackets 64 fixed to the roof panel, said support plates having notches 66 to clear said brackets, as in Figure 4. The support plates constitute closure means for the spaces between the doors and the roof panel 38 when the latter is supported thereby.

In closed position the roof panel 38 is made water tight by means of resilient sealing strips 68 secured alongside the stop strips 58, said sealing strips being compressed against the jamb posts 26. Secured along the header beam 34 is a resilient weather strip 70 held in place by a retaining bar 72. The cover panel 40 has a protruding upper edge 74 which presses into the weather strip 70 when the roof panel 38 is raised, as in Figures 4 and 6, so preventing water run-off from the sloping surface from entering the trailer. As an added feature, the cover panel 40 may be made from corrugated material such as plastic, the corrugations forming multiple channels extending parallel to said upper edge 74, said channels carrying the majority of the water to the ends of the roof panel, only a minimum of water collecting at the weather strip 70.

While the roof panel 38 is comparatively light and easily raised, it may be necessary to add some assistance. This is accomplished by means of lifter arms 76 pivotally attached at one end to brackets 78 on the jamb posts 26 substantially below the header beam 34. Each side edge of the roof panel 38 is fitted with a longitudinally slotted track 80, the other end of each lifter arm 76 having a guide pin 82 which slides in the respective track, as in Figure 6. Connected to the lifter arms 76 intermediate their ends are lifter springs 84, the other ends of which are secured to the jamb posts 26 above the brackets 78. When the roof panel 38 is closed, the lifter arms 76 lie vertically downwardly between the edges of the roof panel and the end posts 24, slight clearances being left for such a purpose. In the initial stages of opening, the spring action is minimized, but as the roof panel is lifted higher and the lifter arms 76 swing outwardly, so increasing the effective lever arm and providing maximum spring assistance when needed in the final travel of the roof panel. The top 22 preferably has an overhang 86 to keep rain from the upper joints of the trailer body. It should be noted that a curtain or the like, indicated in broken line at 88 in Figure 1, may be hung from the roof panel 38 to form a sheltered enclosure when necessary.

The trailer is provided with suitable jacks 90 at the rear corners thereof, the jacks being conventional and either separate units or retractible into the chassis, the arrangement depending on the particular chassis construction. The front of the trailer is supported by a conventional screw jack 92 through the tow bar 14, said screw jack being fitted with a caster 94 to assist in maneuvering the trailer. For additional stability, the doors 28 may be provided with jack rods 96 which retract vertically into sleeves 98 fitted into the outer corners of the doors, as in Figure 5. The jack rods 96 have longitudinally spaced holes 100 therein and are secured by means of lock pins 102 passed through the sleeves 98 and through the appropriate holes to support the doors at the required height.

The trailer body 15 may be constructed from wood, metal, plastics, or various combinations of such materials, the precise structure, other than that described in detail, not being critical. Windows 104 may be installed in the body as necessary and an access door may be made in one end if required. The interior of the trailer may, of course, be fitted with sleeping and cooking accommodations. In particular, it should be noted that the doors 28 provide useful cupboards 106 and any items stored therein or attached thereto become readily accessible when the doors are opened.

The trailer is primarily intended as a small unit suitable for towing behind sport cars, or the like, and is designed to provide a maximum of dimensions. The enclosure formed by the open doors and roof panel adds considerable useful area and the upwardly sloping roof panel provides ample head room.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. A trailer, comprising: a chassis having a wheeled carriage; a body mounted on said chassis; said body having a fixed roof structure and one substantially open side; a panel having an upper edge hinged to an edge portion of said fixed roof structure and disposed in said open side and substantially closing the side; said panel in operative position extending upwardly and outwardly from said upper edge and constituting a roof element extending from said open side; a pair of doors mounted in said open side inwardly of said panel; said doors being hinged to opposite ends of said open side to swing outwardly therefrom; said doors providing supports for said panel when the panel is raised as a roof; and said doors having cupboards on the inner faces thereof exposed for use when swung inwardly as well as when swung outwardly.

2. A trailer, comprising: a chassis having a wheeled carriage; a body mounted on said chassis; said body having a fixed roof structure and one substantially open side; a panel having an upper edge hinged to an edge portion of said fixed roof structure and disposed in said open side and substantially closing the side; said panel being movable upwardly and outwardly and constituting a roof element extending from said open side; a pair of doors mounted in said open side inwardly of said panel; said doors being hinged to opposite ends of said open side to swing outwardly therefrom; said doors having support members pivotally attached to the upper edges thereof; said support members being movable to vertical positions above said doors and having upwardly and outwardly inclined edges providing supports for said panel, whereby the panel is held extended with its outer edge substantially higher than the hinged edge thereof; and said doors having cupboards on the inner faces thereof exposed for use when swung inwardly as well as when swung outwardly.

3. A trailer, comprising: a chassis having a wheeled carriage; a body mounted on said chassis; said body having a fixed roof structure and one substantially open side; a panel having an upper edge hinged to an edge portion of said fixed roof structure and disposed in said open side and substantially closing the side; said panel being movable upwardly and outwardly and constituting a roof element extending from said open side; a pair of doors mounted in said open side inwardly of said panel; said doors being hinged to opposite ends of said open side to swing outwardly therefrom; said doors having support members pivotally attached to the upper edges thereof; said support members being movable to vertical positions above said doors and having upwardly and outwardly inclined edges providing supports for said panel, whereby the panel is held extended with its outer edge substantially higher than the hinged edge thereof; said support members being plates of tapered form and being means for closure of the spaces between the upper edges of the doors and said panel when the latter is supported thereby; and said doors having cupboards on the inner faces thereof exposed for use when swung inwardly as well as when swung outwardly.

4. A trailer, comprising: a chassis having a wheeled carriage; a body mounted on said chassis; said body having a fixed roof structure and one substantially open side; a panel having an upper edge hinged to an edge portion of said fixed roof structure and disposed in said open side and substantially closing the side; said panel being movable upwardly and outwardly and constituting a roof element extending from said open side; a pair of doors mounted in said open side inwardly of said panel; said doors being hinged to opposite ends of said open side to swing outwardly therefrom; said doors having support members pivotally attached to the upper edges thereof; said support members being movable to vertical positions above said doors and having upwardly and outwardly inclined edges providing supports for said panel, whereby the panel is held extended with its outer edge substantially higher than the hinged edge thereof; said panel having a corrugated upper surface, the corrugations extending parallel to the hinged edge of the panel; a resilient weather strip secured across said open side above the hinged edge of said panel; and a protruding edge portion on said panel engageable with said weather strip when the panel is raised, said corrugations being disposed to drain rain water to the ends of the panel rather than toward said hinged edge and whereby only a minimum of said rain water is permitted to reach said hinged edge.

5. A trailer comprising: a chassis having a wheeled carriage; a body mounted on said chassis; said body having a fixed roof structure and one substantially open side; a panel having an upper edge hinged to an edge portion of said fixed roof structure and disposed in said open side and substantially closing the side; said panel being movable upwardly and outwardly and constituting a roof element extending from said open side; a pair of upright jamb posts fixed at opposite ends of said open side; a pair of doors hinged to said jamb posts and positioned inwardly of said panel when closed; said doors being hinged to swing outwardly from said open side; said doors having support members pivotally attached to the upper edges thereof; said support members being movable to vertical positions above said doors and having upwardly and outwardly inclined edges providing supports for said panel, whereby the panel is held extended with its outer edge substantially higher than the hinged edge thereof; said panel having stop strips fixed adjacent the end edges thereof and comprising stops for said support plates; and resilient sealing strips secured alongside said stop strips; said sealing strips bearing against said jamb posts when said panel is closed.

6. A trailer comprising: a chassis having a wheeled carriage; a body mounted on said chassis; said body having a fixed roof structure and one substantially open side; a panel having an upper edge hinged to an edge portion of said fixed roof structure and disposed in said open side and substantially closing the side; said panel being movable upwardly and outwardly and constituting a roof element extending from said open side; a pair of upright jamb posts fixed at opposite ends of said open side; a pair of doors hinged to said jamb posts and positioned inwardly of said panel when closed; said doors being hinged to swing outwardly from said open side; said doors having support members pivotally attached to the upper edges thereof; said support members being movable to vertical positions above said doors and having upwardly and outwardly inclined edges providing supports for said panel, whereby the panel is held extended with its outer edge substantially higher than the hinged edge thereof; said panel having stop strips fixed adjacent the end edges thereof and comprising stops for said support plates; and resilient sealing strips secured alongside said stop strips; said sealing strips bearing against said jamb posts when said panel is closed; a resilient weather strip secured across said open side above the hinged edge of said panel; said panel having a protruding edge portion engageable with said weather strip when the panel is raised.

7. A trailer, comprising: a chassis having a wheeled carriage; a body mounted on said chassis; said body having a fixed roof structure and one substantially open side; a panel having an upper edge hinged to an edge portion of said fixed roof structure and disposed in said open side and substantially closing the side; said panel being movable upwardly and outwardly and constituting a roof element extending from said open side; a pair of upright jamb posts fixed at opposite ends of said open side; a pair of doors hinged to said jamb posts and positioned inwardly of said panel when closed; said doors being hinged to swing outwardly from said open side; said doors having support members pivotally attached to the upper edges thereof; said support members being movable to vertical positions above said doors and having upwardly and outwardly inclined edges providing supports for said panel, whereby the panel is held extended with its outer edge substantially higher than the hinged edge thereof; and spring means operatively connected between said panel and said jamb posts to urge the panel upwardly.

8. A trailer, comprising: a chassis having a wheeled carriage; a body mounted on said chassis; said body having a fixed roof structure and one substantially open side; a panel having an upper edge hinged to an edge portion of said fixed roof structure and disposed in said open side and substantially closing the side; said panel being movable upwardly and outwardly and constituting a roof element extending from said open side; a pair of doors mounted in said open side inwardly of said panel; said doors being hinged to opposite ends of said open side to swing outwardly therefrom; said doors having support members pivotally attached to the upper edges thereof; said support members being movable to vertical positions above said doors and having upwardly and outwardly inclined edges providing supports for said panel, whereby the panel is held extended with its outer edge substantially higher than the hinged edge thereof; said support members being plates of tapered form and being means for closure of the spaces between the upper edges of the doors and said panel when the latter is supported thereby; the inner sides of said doors having cupboards therein, said cupboards being accessible when the doors are opened as well as when closed, said doors, panel and support members constituting weather shields for said cupboards, when the doors are opened and the panel is supported by said support members.

References Cited in the file of this patent

UNITED STATES PATENTS

| | | |
|---|---|---|
| 2,155,582 | Bond | Apr. 25, 1939 |
| 2,155,876 | Stout | Apr. 25, 1939 |
| 2,395,691 | Smith | Feb. 26, 1946 |
| 2,551,207 | Ensor | May 1, 1951 |
| 2,832,637 | DeCosse | Apr. 29, 1958 |
| 2,860,384 | Wait | Nov. 18, 1958 |

FOREIGN PATENTS

| | | |
|---|---|---|
| 481,768 | Great Britain | Mar. 17, 1938 |